United States Patent Office 3,049,504
Patented Aug. 14, 1962

3,049,504
EPOXIDIZED ANIMAL FAT DIACETOGLYCERIDES AS PLASTICIZERS
Daniel Swern, Philadelphia, and Hogan B. Knight, Spring House, Pa., assignors to the United States of America as represented by the Secretary of Agriculture
No Drawing. Original application Apr. 12, 1954, Ser. No. 422,706, now Patent No. 2,898,348, dated Aug. 4, 1959. Divided and this application Jan. 10, 1956, Ser. No. 563,827
2 Claims. (Cl. 260—23)
(Granted under Title 35, U.S. Code (1952), sec. 266)

A non-exclusive, irrevocable, royalty-free license in the invention herein described, throughout the world for all purposes of the United States Government, with power to grant sublicenses for such purposes, is hereby granted to the Government of the United States of America.

This invention relates to plasticizer-stabilizers for synthetic resins. It is a division of Serial No. 422,706, filed April 12, 1954.

Most synthetic resins require plasticization to facilitate fabrication and to improve the flexibility and toughness of the product. Most of them also require stabilizers to improve heat and light stability. Most conventional plasticizers contribute nothing to heat and light stability and some actually detract from whatever stability the base resin might inherently possess.

In recent years it has been found that certain epoxidized vegetable oils such as cottonseed, soybean, or olive oil have some value as plasticizers and, in addition, are excellent stabilizers for certain synthetic resins. Unfortunately, they suffer the serious handicap that they have very limited compatibility with most resins and hence must be blended with large amounts of other, more compatible, plasticizers. The small proportion that is compatible is usually sufficient to provide satisfactory stability to heat and light but for most purposes is far less than is needed to provide sufficient plasticization.

The poor compatibility of the epoxidized oils is believed to be due to the predominance of long-chain fatty acid radicals in the natural glyceride molecule and the bulkiness of the molecule.

It is an object of this invention to provide plastic compositions which are plasticized with epoxidized animal fat diacetoglycerides that are highly compatible and efficient plasticizer-stabilizers and that may be produced from plentiful and inexpensive animal fats such as lard, tallow and grease. Other objects will appear hereinafter.

Since the overwhelming bulk of all commercially available animal fats consists of lard, tallow or grease, the term "animal fats," as used herein, may be understood to include only lard, tallow and grease.

We have now discovered that animal fats may be used as the sole source of fatty acids in the preparation of epoxidized diacetoglycerides that have excellent compatibility, plasticizing efficiency and stabilizing action in most synthetic resins. Among the commercially important synthetic resins in which these properties are obtained are those containing polymerized vinyl chloride such as polymerized vinyl chloride only, and copolymers of vinyl chloride with vinyl esters of fatty acids or with vinylidene chloride, cellulose esters, nitrocellulose and chlorinated rubber.

Lard usually contains about 30 to 50% of saturated fatty acids; tallow contains about 45 to 60%; while grease, being composed mostly of a mixture of lard and tallow, contains about 35 to 55%. In general, any animal fat or fatty derivative containing 30 to 60% of saturated fatty acids is suitable for use in our invention. By fatty derivative we mean the fatty acids or their esters.

Any convenient, known method may be used in converting the animal fats to diacetoglycerides and in epoxidizing the diacetoglycerides to form the final plasticizer-stabilizer. All of these steps are well known in the art. A suitable and convenient method is to treat the animal fats with triacetin, thus forming the diacetoglyceride; then treat the latter with a peracid to form the epoxidized diacetoglyceride. In the latter step, the peracid may be added as such or it may be formed in situ by the action of hydrogen peroxide on an organic acid such as formic or acetic acid. Alternatively, the animal fats may be treated with glycerol to form the monoglyceride; the latter may then be acetylated with acetic acid or acetic anhydride to form the diacetoglyceride, and this is then epoxidized. Other variant processes will be apparent to those skilled in the art.

In such methods an average of about two of the acid moiety groups of the animal fat glycerides are converted to aceto groups, and the third acid moiety group, i.e. the long-chain unsaturated fatty acid group, have the double bonds substantially completely epoxidized.

The epoxidized diacetoglycerides made from animal fats enjoy two great advantages over similar materials made from the more unsaturated vegetable and fish oils: (1) the animal fats used as raw material are abundantly available and are much less expensive than the vegetable and fish oils; (2) having a much lower degree of unsaturation, they require proportionately less peroxide or peracid for the epoxidation step, thus greatly reducing the manufacturing cost of the product.

Because of their high compatibility and efficiency and low cost, it is usually advantageous to use our epoxidized diacetoglycerides as primary plasticizers, in which case they may constitute as much as 40% of the plasticized plastic. Where they are used primarily as stabilizers, however, as little as 1% shows a definite stabilizing effect, particularly in compositions containing polymerized vinyl chloride.

While the preparation and epoxidation of diacetoglycerides from natural fats are well known, conventional procedures, these steps are included in the examples below for illustrative purposes.

EXAMPLE I

*Epoxidized Diacetoglycerides From Tallow*

*Diacetoglycerides.*—A mixture of 400 g. of triacetin and 277 g. of tallow (iodine number 50) was heated to 90° C. A solution of 2 g. of metallic sodium in 25 ml. of methanol was added and the mixture was stirred at 90° C. for 2 hours. The reaction mixture was then dissolved in ether and washed with water to remove excess triacetin. The ether was distilled off and the triacetin not removed by water washing was separated by heating under vacuum. The yield of diacetoglycerides (a pale-yellow oil) was substantially quantitative (420 g.). Its iodine number was 31 and its saponification number 390.

*Epoxidation.*—To 50 g. of the diacetoglycerides, 50 ml. of 20% peracetic acid in acetic acid was added dropwise with agitation. The temperature was maintained at 20–25° C. for 3 hours, after which the solution was poured into water and extracted with ether. The ether solution was washed with water until acid-free and the ether was distilled off. The yield of epoxidized diacetoglycerides was 43 g. Its iodine number was below 2 and its oxirane oxygen content was 1.66%.

EXAMPLE II

*Epoxidized Diacetoglycerides From Lard*

As described in Example I, 411 g. of diacetoglycerides (iodine number 42 and saponification number 410) were prepared from lard. From 50 g. of these and 60 ml. of 20% peracetic, 42 g. of epoxidized diacetoglycerides, iodine number 2 and oxirane oxygen, 2.28%, were obtained.

The results of using the epoxidized animal fat acetoglycerides as plasticizing-stabilizers for polyvinyl chloride are given below. The recipe employed was polyvinyl chloride:acetate (95:5), 65 parts; plasticizer, 35 parts; stearic acid, 0.5 part. Results obtained with dioctyl phthalate and also tricresyl phosphate are given for comparison; with these two plasticizers, 1 part of lead carbonate was also added to the formula since otherwise their heat stability was too poor to permit evaluation.

TABLE I.—PROPERTIES OF PLASTICIZED VINYL CHLORIDE RESIN

| Plasticizer | Light Stability | Heat Stability | Tensile Strength, lbs. per sq. in. | Elongation, Percent | Modulus at 100% Elong. | Clash-Berg, °C. |
|---|---|---|---|---|---|---|
| Epoxidized Diacetoglycerides of Tallow (Example I) | Excellent | Good | 2,800 | 365 | 1,230 | −19 |
| Epoxidized Diacetoglycerides of Lard (Example II) | do | do | 3,100 | 400 | 1,300 | −21 |
| Dioctyl Phthalate | Fair | Fair | 3,000 | 390 | 1,300 | −28 |
| Tricresyl Phosphate | Poor | do | 3,600 | 295 | 2,000 | 0 |

The epoxidized animal fat diacetoglycerides of Examples I and II, and similar products made from commercial grease, show plasticizing and stabilizing properties similar to those shown in Table I when, instead of the 95:5 copolymer of vinyl chloride-acetate, other vinyl chloride copolymers were used such as vinyl chloride-acetate containing higher percentages of acetate, or vinyl chloride copolymers with vinylidene chloride or with vinyl esters of higher fatty acids. Similar results were also obtained with polymerized vinyl chloride. The products of Examples I and II also show valuable plasticizing and stabilizing action in many other synthetic resins having inherent sensitivity to heat and light, such as cellulose esters, cellulose nitrate and chlorinated rubber.

We claim:

1. A plastic composition comprising polymerized vinyl chloride and, as a plasticizer-stabilizer therefor, an epoxidized diacetoglyceride of fatty acids selected from the group consisting of lard fatty acids, tallow fatty acids and mixtures thereof.

2. A plastic composition comprising a copolymer of vinyl chloride and vinyl acetate and, as a plasticizer-stabilizer therefor, an epoxidized diacetoglyceride of fatty acids selected from the group consisting of lard fatty acids, tallow fatty acids and mixtures thereof.

No references cited.